I. F. BODLE.
TELLURIAN.
APPLICATION FILED APR. 21, 1911.
1,019,750.
Patented Mar. 12, 1912.
5 SHEETS—SHEET 3.
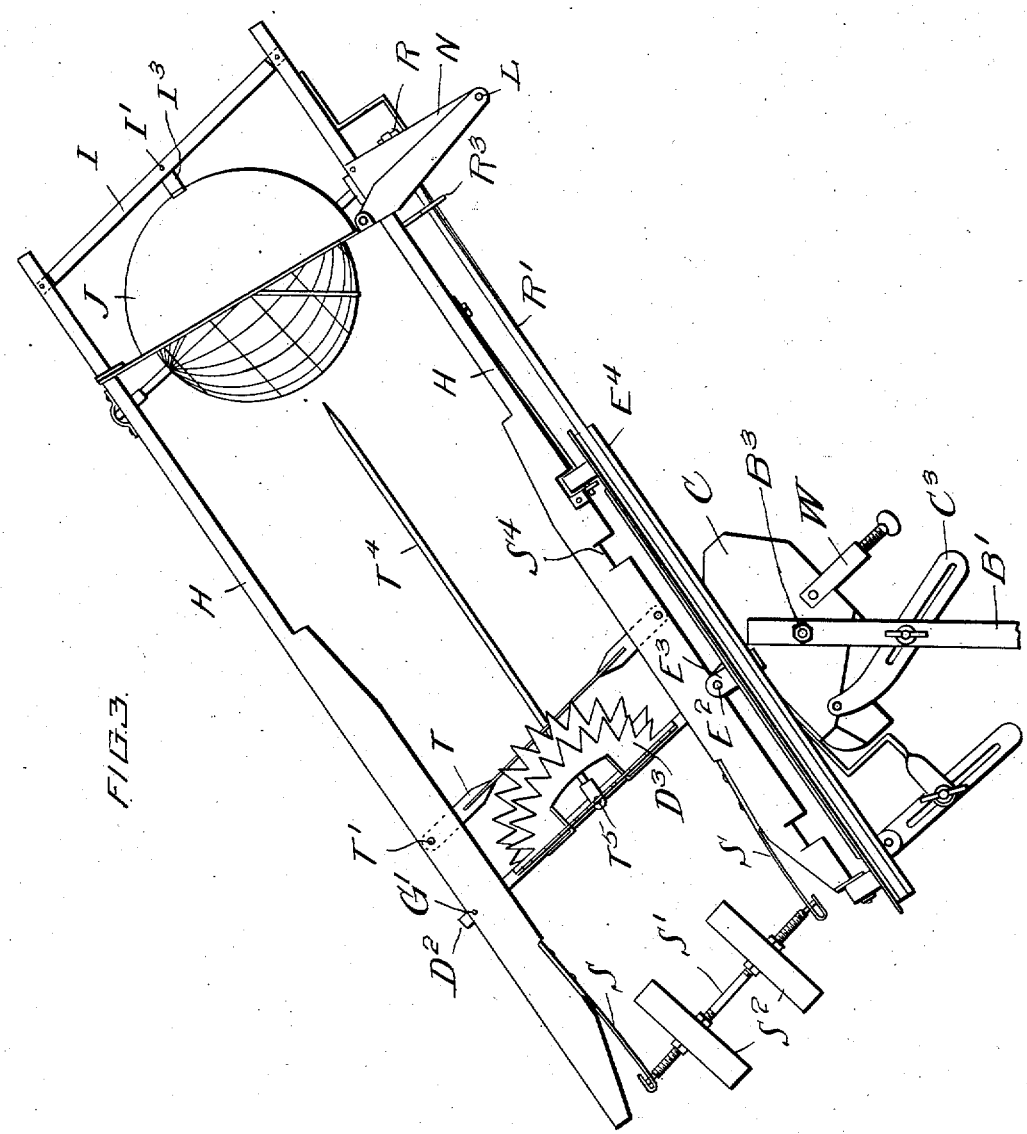

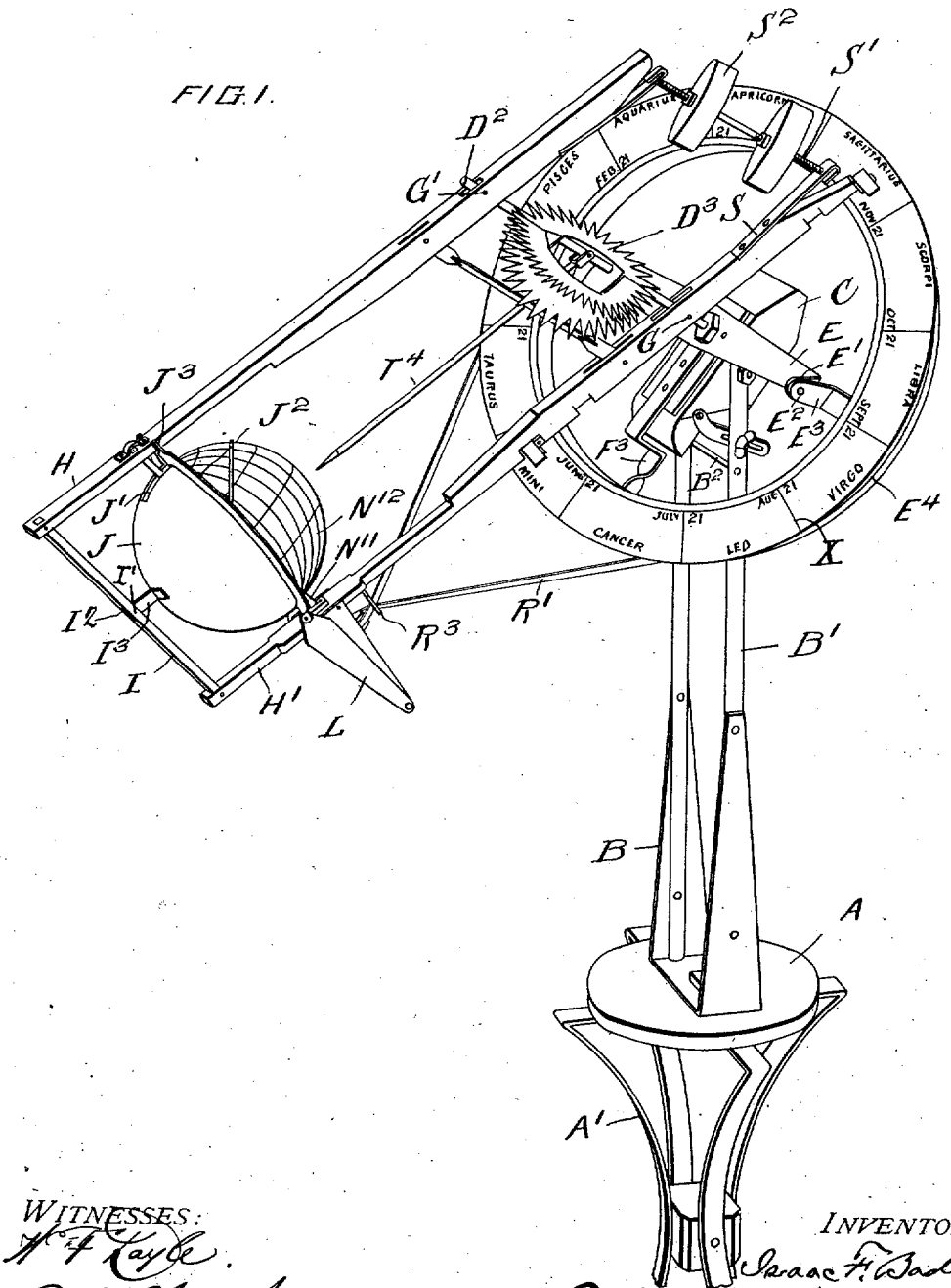

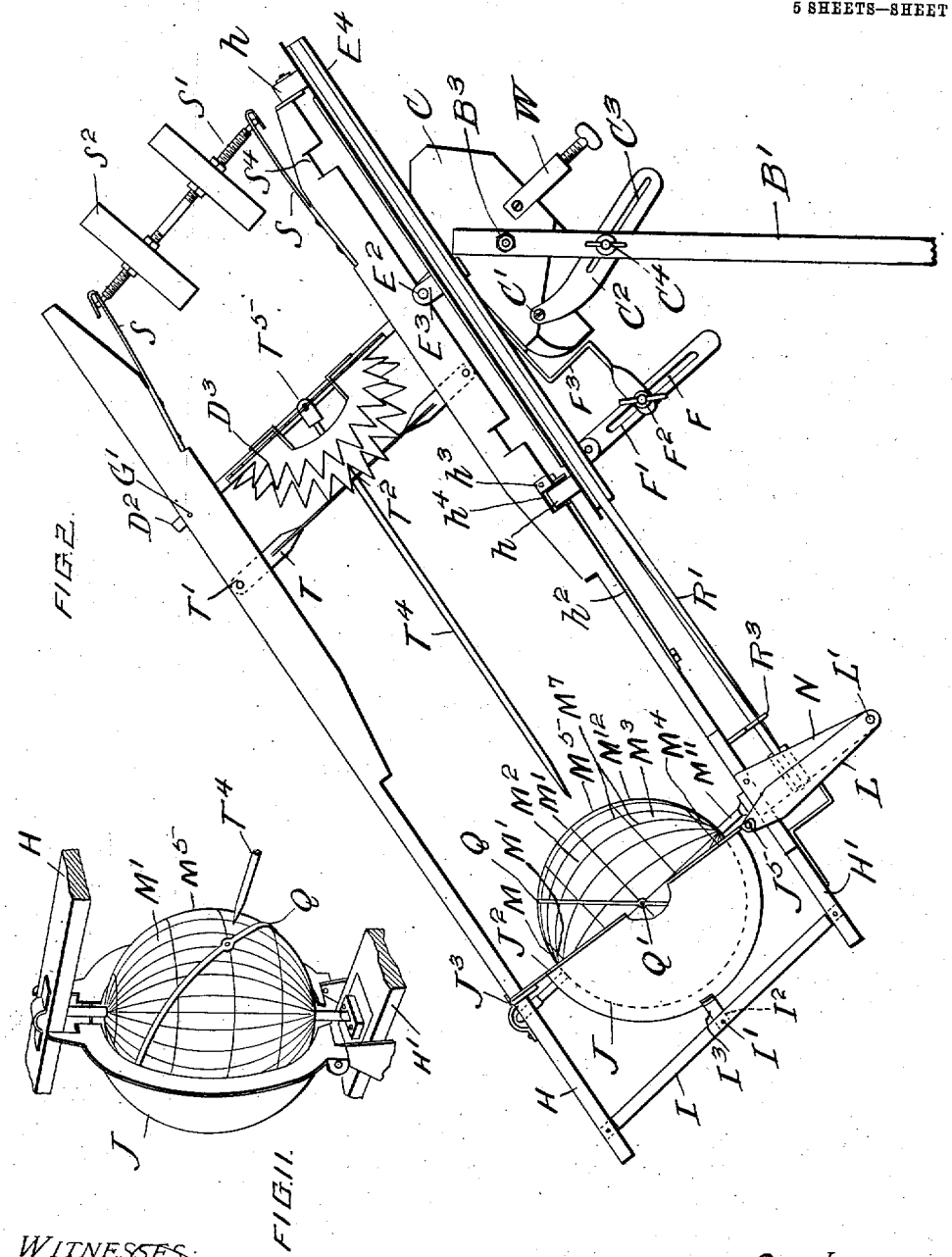

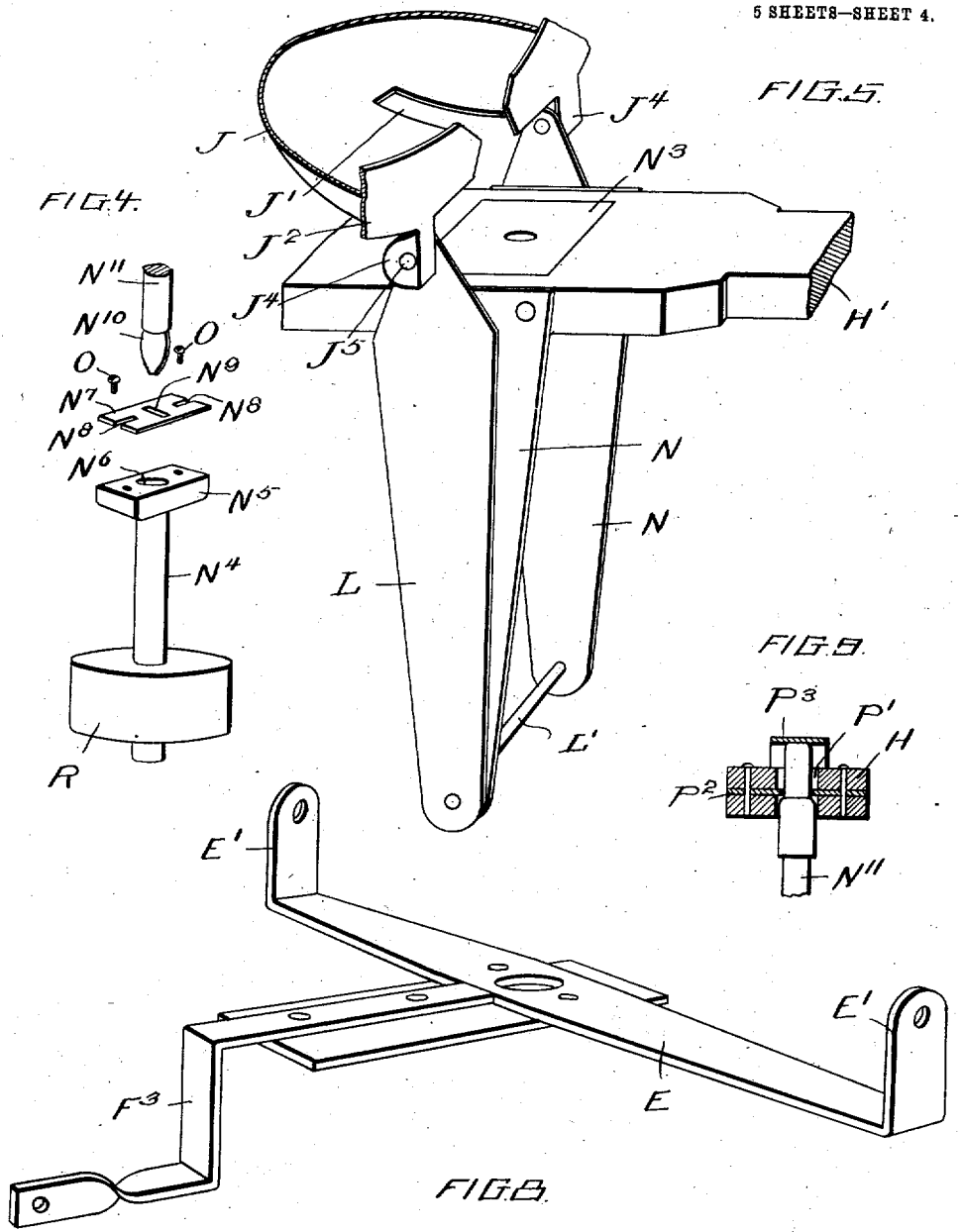

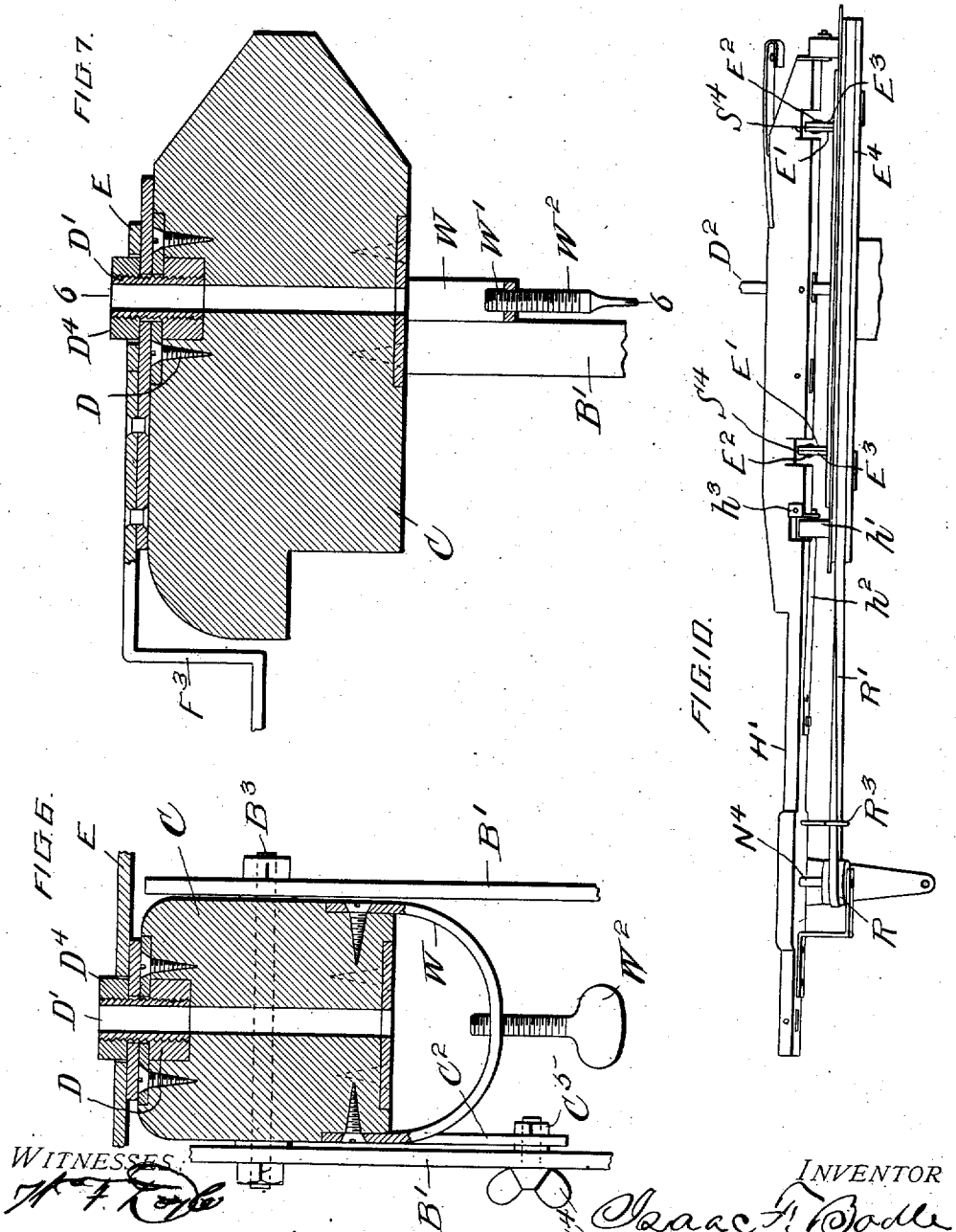

UNITED STATES PATENT OFFICE.

ISAAC F. BODLE, OF SOUTH EATON, PENNSYLVANIA, ASSIGNOR TO S. ESTHER LEE BODLE, OF JERMYN, PENNSYLVANIA.

TELLURIAN.

1,019,750.   Specification of Letters Patent.   Patented Mar. 12, 1912.

Application filed April 21, 1911. Serial No. 622,618.

*To all whom it may concern:*

Be it known that I, ISAAC F. BODLE, a citizen of the United States, residing at South Eaton, in the county of Wyoming and State of Pennsylvania, have invented certain new and useful Improvements in Tellurians; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tellurians or apparatus adapted to illustrate and aid in teaching mathematical geography with special reference to change of seasons and incidentally every other fact of mathematical geography.

The invention comprises various details of construction and combinations and arrangements of parts which will be hereinafter fully described and then specifically defined in the appended claims.

My invention is illustrated in the accompanying drawings, in which:—

Figure 1 is a perspective view of the apparatus. Fig. 2 is a view in side elevation showing the relative positions of the earth and the sun, showing the shadowed line receded to its farthest limit from the South Pole. Fig. 3 is a similar view showing the shadowed portion receded farthest from the North Pole and illustrating the globe diametrically opposite the position in Fig. 2 in its orbit. Fig. 4 is an enlarged detail perspective view showing the connections for rotating the axis of the globe. Fig. 5 is a detail perspective view of a portion of the night hood in which the globe rotates and illustrating means for holding the globe and hood from contact with each other. Fig. 6 is a sectional view taken on line 6—6 of Fig. 7. Fig. 7 is a detail sectional view longitudinally through the tilting block and sleeve seated therein. Fig. 8 is a detail view of a slotted plate mounted upon the head of the bearing in which the axis is mounted. Fig. 9 is a sectional view longitudinally through the upper pivotal point of the axis of the globe and showing one of the bars of the parallelogram in cross section. Fig. 10 is an edge view showing the planes of the zone guide and pulley at angles to each other, and Fig. 11 is a detail perspective view of the apparatus illustrating the apparent point at which the sun rises at the time of the spring equinox.

Reference now being had to the details of the drawings by letter, A designates a table supported upon legs A', made preferably in the shape shown in the drawings, and rising from said table is a standard B having two arms B' between which are mounted rounds $B^2$ and $B^3$, the latter of which forms a pivot upon which the tilting block C is mounted. Pivotally mounted upon the pin C' projecting from the block is a bar $C^2$ having an elongated, slightly curved slot $C^3$ therein, and $C^4$ is a thumb screw mounted in a threaded opening in one of said arms and passes through said slot, and a nut $C^5$ is mounted upon the threaded end of the thumb screw and affording means whereby the block may be easily and quickly adjusted and held at an inclination. Seated in a socket D in the upper surface of said block is a bushing or sleeve D', forming a bearing for the lower end of the main axis $D^2$ which passes through the center of the sun $D^3$ and with which the parallelogram to be hereinafter described, revolves. Fastened to the upper surface of said block is a plate E, the ends of which project at right angles from the block and which plate is held in place by means of a nut $D^4$ mounted upon the threaded circumference of said bushing or sleeve. The ends E' of the plate E are bent at right angles and each end carries a pivot pin $E^2$ upon each of which the angled end of a bar $E^3$ is pivotally mounted. Said angled bars $E^3$ are fastened to the under surface of the zone guide $E^4$ at points diametrically opposite and by which mechanism the block and the zone guide are allowed to rock on the arcs of the same circle. An auxiliary tilting movement is imparted to the zone guide through the medium of a pivotal bar F, which is pivoted to the zone guide and is provided with an elongated slot F' through which a thumb screw $F^2$ passes, which is mounted in the threaded opening in an angled arm $F^3$ which is fastened rigidly to said block. By the manipulation of the thumb screw $F^2$, it will be noted that the zone guide may be tilted independent of the angle indicated by the block for the purpose which will be presently described.

Pivotally mounted upon the pins G and G' which are carried by the main axis are the two bars H and H', forming the opposite sides of a parallelogram, and I designates the end piece of the parallelogram, the ends of which are pivoted to the ends of the bars H and H'. The end piece I carries a pivotal pin I' which passes through a slot $I^2$ and upon which pin I' a lug $I^3$ is pivoted which is integral with the hollow night hood J and which is preferably of a dark color and is adapted to designate the shadowed half of the earth in its different positions in its orbit about the sun. Said member J is provided with diametrically opposite radial slots J', adapted to receive the ends of the axis of the globe as the latter assumes different positions in its orbit about the sun. Said night hood has a laterally extending flange $J^2$ along its marginal edge which is adapted to designate the true line between the shadow and the light portions of the globe representing the earth. Said flange is provided with lugs $J^3$, one upon either side of the bar H and adapted to hold the bar H against a lateral movement and which tends to prevent the globe from coming in contact with the hood. Said flange also has other lugs $J^4$ adjacent to the marginal edge of the lower of said radial slots and carries pivotal pins $J^5$ upon which the upper ends of the links L are pivotally mounted, which links are pivotally connected near their lower ends to a pin L' and with which the lower ends of the arms N are pivotally connected and by which connection the links are adapted to describe an arc designating the limit of movement of the night hood during the revolution of the earth in its orbit about the sun. Said arms are fastened at their upper ends rigidly to the opposite edges of the bar H'.

Countersunken within a recess in the upper surface of the bar H' is a plate $N^3$ having an aperture therein for the reception of the shaft $N^4$, having a head $N^5$ which is supported by said plate. The upper surface of the head $N^5$ has a recess $N^6$ therein, and $N^7$ is a plate having slots $N^8$ in the opposite ends thereof and is provided with a transverse slot $N^9$ through which the contracted end $N^{10}$ of the lower end of the axis $N^{11}$ of the globe $N^{12}$ is adapted to have a universal movement. Headed screws O are mounted in threaded holes in the end of said head and pass through said slots which are elongated and are provided for the purpose of allowing a slight longitudinal movement to the plate as required by the axis at different slants or inclinations. Said flattened end of the axis also has a movement lengthwise of the slot in the plate during the other movements of the axis. The upper end of said axis $N^{11}$ passes through an aperture P' formed in the plate $P^2$ which is seated in a recess or slot formed in the bar H, and which plate is so positioned in the bar H of the parallelogram as to be in a plane coincident with the pivotal points connecting the end piece of the parallelogram with the bar H and also with the pivot of the upper end of the main axis of the sun. A guard $P^3$ is fastened to the upper surface of the bar H over the upper end of the axis $N^{11}$ and serves to hold the lower end of the latter in its universal bearing.

The different zones on the surface of the globe are designated by letters M, indicating the Arctic region, M' the North Temperate, $M^2$ the Torrid, $M^3$ the South Temperate and $M^4$ the South Frigid or Ant-Arctic region.

$M^7$ designate the meridians of longitude upon the surface of the globe, one of which has graduations thereon as designated by letter $M^{12}$, indicating the sub-divisions of a quadrant from the equator to the pole. A band, designated by letter Q, passes about the globe and is pivotally mounted at points diametrically opposite upon the pins Q'. Said graduated meridian is positioned at points equidistant from the pivotal points of the band in order to designate the local vertical equator at different degrees of elevation between the equator and the pole, the local vertical equator being a plane (indefinite in extent) passing through the point of observation, also the center of the earth and cutting the meridian of the observer at right angles.

Fixed to the shaft $N^4$ is a pulley R, and R' designates a belt passing about said pulley and also about a circumferential groove in the zone guide, said belt being made to intersect by its passing through the eye $R^3$ of a bolt fastened to the arm H' and serving to retain the belt upon said pulley $R^3$. The center of said eye is at all times axially in alinement with the center of the upper surface of the zone guide and with a line diametrically through said pulley at all times during the revolution of the globe about the sun, it being understood that the planes in which the pulley and zone guide are mounted vary as to coincidence or slant during the revolution of the earth about the sun. For instance, on reference to Fig. 2 of the drawings it will be noted that the planes of the pulley and zone guide are in coincidence, whereas in Fig. 10 they are disposed at slight angles to each other.

Mounted upon the end of the bar H' is an anti-friction roller $h$ and a second anti-friction roller, designated by $h'$, is mounted upon a spring $h^2$, one end of which is fastened to the bar $H'$ and the end of the spring $h^2$ is held from lateral movement by a slotted plate $h^3$ fastened to the marginal edge of the recess $h^4$ formed in the bottom of the bar $H'$. Said anti-friction rollers $h$ and $h'$ are adapted to ride upon the upper surface of the zone guide and to lessen the friction intermediate the rotating parallelogram and the zone guide, the spring upon which the roller is mounted serving to equalize the pressure upon the two rollers. Resilient arms, designated by letter S, are fastened one to each of said arms $H$ and $H'$ and a rod $S'$ is held in apertures in said resilient arms and upon which rod a weighted member $S^2$ is mounted, serving to counterbalance the parallelogram and which will tend to cause the latter to rotate in its orbit smoothly and with little resistance. By the provision of said resilient arms, the rod with the weighted member may be conveniently detached therefrom when it is desired to relieve the parallelogram of unnecessary weight when not in use.

In order to allow the bar $H'$ to clear the pivotal angled ends of the plate upon the inclined block, recesses $S^4$ are formed in the lower edges of said bar, as shown clearly in side elevation of the drawings. A bar $T$ is pivotally connected at one end as at $T'$ to the bar $H$ and its other end to the bar $H'$ and has a central aperture $T^2$ through which a pointer $T^4$, designating the vertical ray of the sun at all times, passes, said pointer being pivotally connected upon the pivotal pin $T^5$ upon the main axis and at the center of the sun. The free end of said pointer $T^4$, it will be understood, oscillates in the rotary movement of the globe about the sun between the marginal lines of the Torrid Zone, establishing the solstices upon the 21st of June and 21st of December and indicating the equinoxes upon the 21st of March and upon the 21st of September.

A yoke, designated by letter W, has its ends fastened to the opposite sides of said block and is provided with a threaded aperture $W'$ in which a thumb screw $W^2$ is mounted, the end of which is adapted to bear against the lower end of the main axis of the sun and is provided for the purpose of imparting a longitudinal movement to said axis to relieve the upper surface of the zone guide from the entire or nearly the entire weight of the parallelogram. The upper surface of the zone guide is divided into sections by radial lines X, the spaces between which indicate the signs of the zodiac, there being twelve of such sub-divisions, 30 degrees each.

It will be understood that in my apparatus the parts designating the sun and its axis, which are shown and described as rotating together, merely represents the center about which the globe revolves in its orbit.

In operation, as the parallelogram revolves, the band about the zone guide is held by its frictional contact therewith and causes the pulley connected to the axis of the globe to rotate. Referring to Fig. 2 of the drawings, the globe assumes the position which would designate the summer season in the Southern Hemisphere while winter conditions obtain in the north, the vertical ray pointing toward the Tropic of Capricorn, the days and nights being of equal length at the equator. The relative position of the earth and the night hood designating, in Fig. 2, the length of days as increasing from the equator toward the South Pole and decreasing or diminishing toward the North Pole.

In Fig. 3 the globe, being illustrated at a point diametrically opposite from the position shown in Fig. 2, designates conditions reversed, that is the summer season in the Northern Hemisphere while winter conditions prevail in the Southern Hemisphere with the sun's rays being vertical with the Tropic of Cancer, the days from the equator toward the South Pole decreasing in duration and increasing toward the North Pole, which would be the natural conditions obtaining when the globe is at positions diametrically opposite in its orbit.

It will be understood that the conditions above described remain the same regardless of the latitude of the observer. By the tilting of the main block, the horizon at any assumed point of observation in the Northern Hemisphere is made coincident with the real horizon of the observer when the meridian is passing through the assumed point of observation shows mid-day from that point. The band Q, designating the local vertical equator, may be turned upon its pivots so as to pass through that point of observation on the meridian midway between those pivotal points and said band will be vertical to the real horizon of the observer. When the meridian passing through the assumed point of observation shows mid-day from that point, said band Q crosses the meridian passing through the assumed point at right angles and therefore indicates the true east and west line of direction from that point at all times and from this compound movement between an apparent vertical one at the equator and an apparent horizontal one at the northern pole. There results a swinging movement of said east and west line from south to north as viewed eastward. This will explain why the sun has an apparent southern trend in its daily course immediately after appearing above the horizon and continuing southward until mid-day.

Referring to Fig. 11 of the drawings, the plane determined by the band Q intersects the plane of the equator in a straight line, the sun's vertical ray being coincident in the line of intersection produced, it, therefore, following that the sun is in both planes and it is seen that the sun rises due east of the point of observation.

While I have shown by a single band upon the globe the apparent direction of the sun's rising to be due east of observer at the time of the spring equinox, it will be understood that a plurality of similarly constructed bands may be employed, if desired, to show that the same thing obtains in all latitudes, on the same meridian. Said band extended, so as to be regarded as a celestial local vertical equator has a swinging movement and, at the time of the spring equinox, it intercepts the sun at 6 o'clock on the horizon. It will intercept the sun a little later each succeeding morning because the swinging of the eastern line of direction and the apparent motion of the sun are in the same direction and it takes a little longer for the plane of the band to overtake or intercept the sun in the apparent northern course. This greater length of time required for said intercepting causes the sun to shine a little longer time past 6 a. m. each succeeding morning on the north side of objects until June 21st. Then a shorter time past 6 a. m. owing to reversed conditions until September 21st when the intercepting takes place at 6 a. m. again. This intercepting of the plane of the band and the sun between September 21st and March 21st occurs before the sun has reached the horizon.

It will be noted that the change of seasons is shown to depend on the plane of the earth's orbit. The slant of the plane of the orbit allows a north and south trend of the earth in the course of its revolution about the sun. At the time of the winter solstice, the earth in shown to be at the most northern point in its orbit. Perfect winter conditions obtain as the sun moves along from this time in its orbit. It is seen to have the southern trend, causing the sun to have an apparent motion northward which trend is complete at the time of the summer solstice, when the sun is at the southernmost point in its orbit. Summer conditions are then complete. From this time, as the earth moves along its orbit, it is seen to have a northern trend, the sun having an apparent southern course or trend. These conditions are complete at the time of the winter solstice when again the earth has reached its northernmost point, winter conditions being perfect at the point from which we started. It will be understood that, when the plane of the orbit is perpendicular to the axis of the earth, no change of season would be indicated by the rotary movement of the earth through its orbit. It will also be understood that the inclination of the plane of the orbit determines the position of the Arctic Circle, the Tropic of Cancer, the Tropic of Capricorn and the Ant-Arctic Circle, in other words it determines the width of the zones.

Again referring to the top plan view (Fig. 11), the earth being positioned relative to the sun as at the spring equinox, it will be seen that a complete revolution of the earth is necessary to mark the time from one spring equinox to the succeeding one. In brief, the solar year is thus seen to be equal in duration with the sidereal year accomplished by a complete revolution of the earth about the sun. The solar year is shorter than the sidereal year, this being accomplished by less than a complete revolution. If, during the course of revolution, the zone guide is given a partial rotation independent of the block, it will be seen that the succeeding spring equinox is reached before a complete revolution of the earth in its orbit about the sun is had. This has the apparent effect of causing the position of the equinox to proceed toward the right, leaving the constellation marking the spring equinox behind. This is known as the precession of the equinoxes and is merely incidental to the fact that the solar year is shorter than a sidereal year, which marks a complete revolution of the earth in its orbit about the sun.

In order to illustrate the precession of equinoxes upon a globe, the nut is fastened to the zone guide securely and by rotating the parallelogram frame, the solar year will be designated by a complete revolution of the globe in its orbit. Such year is of the same length as a sidereal year. In this case there is no precession but, by loosening the nut slightly, then as the globe is moved in its orbit the zone guide may be rotated a little toward the right (as one faces the zone guide). By this operation, the solar year will be shortened by as much time as the zone guide is rotated in minutes or seconds of longitude and the equinox will also be advanced to the right. This is precession. By rotating the zone guide to the left, while the globe is revolving in its orbit, the solar year will be lengthened and recession of the equinox will take place. It will also be noted that, when this precession of the signs has, through a cycle of time, passed through 360 degrees or a complete revolution, the sign and constellation will again agree. It will be noted that, as the parallelogram revolves through the mechanism shown and described, the angles thereof will vary from an acute into a right angle and then into an obtuse angle and which, through the connections shown, will cause the earth to move to its limit in northerly and southerly positions.

What I claim to be new is:—

1. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, and means for alternately oscillating the hood.

2. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, a stationary zone guide, connections between the latter and said globe adapted to cause the latter to rotate as it travels in its orbit.

3. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, an adjustable zone guide, and connections between the same and globe and designed to cause the latter to rotate as it revolves through its orbit.

4. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, an adjustable zone guide, a rotatable pulley, a belt passing about said pulley and zone guide, and universal pivotal connections between said pulley and axis of the globe and forming means whereby the latter may be caused to rotate as it revolves through its orbit.

5. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, an adjustable zone guide, a rotatable shaft mounted in said frame, a pulley fixed to the shaft, a belt passing about said pulley and zone guide and forming means for rotating the shaft as the globe revolves in its orbit, said shaft having a head with a recess therein in which the lower axes of the globe has a universal movement, and a bearing in the frame for the other end of the axis.

6. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, an adjustable zone guide, a rotatable shaft mounted in said frame and having a head with a recess therein, a slotted, movable plate held in contact with said head and over said recess, the lower end of the axis of globe being contracted and movable within said recess and slotted, and a bearing on the frame for the upper end of the axis.

7. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, a tilting zone guide, means for holding the same at different inclinations, and connections between the zone guide and globe and designed to cause the latter to rotate as it passes through its orbit.

8. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, a standard, a tilting block mounted thereon, a zone guide supported upon said block, means for tilting the zone guide, and connections between the latter and globe for rotating the globe as it travels through its orbit.

9. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, a standard, a tilting block mounted thereon, a zone guide supported upon said block, a bar pivoted to said zone guide and having an elongated slot therein, a set screw carried by the block and engaging said slot, and connections between the zone guide and globe adapted to rotate the same as it revolves through its orbit.

10. A tellurian comprising a revoluble, collapsible frame, a globe pivotally mounted therein, a night hood fastened to the frame and in which the globe rotates and having slots adapted to receive the axes of the globe as the night hood oscillates with the moving of the opposite sides of the frame toward or away from each other, means for alternately oscillating the hood, a standard, a tilting block mounted thereon, a plate fixed to the frame, a tilting zone guide mounted upon said plate, means for holding the zone guide at different inclinations, and connections between said guide and globe and adapted to rotate the same as it revolves in its orbit.

11. A tellurian comprising a revoluble, collapsible frame, a globe having axes pivotally mounted therein, a night hood fastened to the frame and in which the globe rotates, said hood having slots, means for oscillating the hood to receive said axes during each revolution of the globe in its orbit, links pivoted to the hood, arms fastened to the frame and to which said links are pivoted, lugs upon the hood between which one side of the frame is adapted to move, a zone guide, and connections between the latter and said globe and adapted to rotate the same as the globe revolves through its orbit.

12. A tellurian comprising a revoluble, collapsible frame, a globe having axes pivotally mounted therein, a night hood fastened to the frame and in which the globe rotates, said hood having slots, means for oscillating the hood to receive said axes during each revolution of the globe in its orbit, links pivoted to the hood, arms fastened to the frame and to which said links are pivoted, lugs upon the hood between which one side of the frame is adapted to move, a zone guide, a rotatable pulley, a shaft carried by the frame upon which the pulley is mounted, universal joint connections between said shaft and axis of the zone guide, a cross belt passing about the zone guide and pulley, and an eye bolt fastened to the frame and through which the belt travels.

13. A tellurian comprising a revoluble, collapsible frame, a globe having axes pivotally mounted upon the latter, a night hood mounted upon the frame and within which the globe rotates, said hood having diametrically disposed slots to receive axes alternately as said hood oscillates during each revolution of the globe in its orbit, links pivoted to said hood, arms fastened to the frame and to which said links are pivoted, lugs upon the hood between which one side of the frame is adapted to move, a zone guide, and connections between the same and said globe adapted to rotate the same as the globe revolves through its orbit.

14. A tellurian comprising a revoluble, collapsible frame, a globe having axes pivotally mounted upon the latter, a night hood mounted upon the frame and within which the globe rotates, said hood having diametrically disposed slots to receive the axes alternately as said hood oscillates during each revolution of the globe in its orbit, links pivoted to said hood, arms fastened to the frame and to which said links are pivoted, lugs upon the hood between which one side of the frame is adapted to move, a zone guide, a rotatable pulley, a shaft carried by the frame upon which said pulley is mounted, universal joint connections between said shaft and axis of the zone guide, a crossed belt passing about the zone guide and pulley, an eye bolt fastened to the frame and through which the belt travels.

15. A tellurian comprising a standard, a tilting block mounted thereon, a sun axis journaled in suitable bearings in said block, a collapsible frame pivotally connected to said axis, an indicator pivoted to said axis, a rotatable globe mounted in suitable bearings in said frame, an adjustable zone guide, and means for tilting the same and frame.

16. A tellurian comprising a standard, a pivotal block mounted thereon, a sun axis journaled in said block, a collapsible frame having two opposite sides pivotally mounted upon said axis, an indicator pivoted to the axis, a support fastened to the frame through which the indicator passes, a globe journaled in suitable bearings in the opposite sides of the frame, a night hood fastened to the frame and within which the hood rotates, a counter-balanced weight at one end of the frame, a zone guide, and connections between the same and said globe adapted to rotate the latter as the globe revolves in its orbit.

17. A tellurian comprising a standard, a pivotal block mounted thereon, a sun axis journaled in said block, a collapsible frame having two opposite sides pivotally mounted upon said axis, an indicator pivoted to the axis, a support fastened to the frame through which the indicator passes, a globe journaled in suitable bearings in the opposite sides of the frame, a night hood fastened to the frame and within which the hood rotates, a counter-balanced weight at one end of the frame, a zone guide, connections between the same and said globe adapted to rotate the latter as the globe revolves in its orbit, and anti-friction rollers mounted upon the frame adapted to contact with the zone guide to equalize the weight of the frame relative to the zone guide.

18. A tellurian comprising a standard, a pivotal block mounted thereon, a sun axis journaled in said block, a collapsible frame having two opposite sides pivotally mounted upon said axis, an indicator pivoted to the axis, a support fastened to the frame through which the indicator passes, a globe journaled in suitable bearings in the opposite sides of the frame, a night hood fastened to the frame and within which the hood rotates, a counter-balanced weight at one end of the frame, a zone guide, connections between the same and said globe adapted to rotate the latter as the globe revolves in its orbit, a spring fastened to one side of the frame, an anti-friction roller journaled thereon, an anti-friction roller journaled upon the frame adjacent to one end thereof, said rollers adapted to bear against the zone guide to equalize the weight of the frame relative to said guide.

19. A tellurian comprising a standard, a pivotal block mounted thereon, a rotatable sun axis mounted in a suitable bearing in said block, means for adjusting said axis longitudinally and holding the same in an adjusted position, a collapsible frame pivotally mounted upon said axis, a rotatable globe upon the frame, means for rotating the same, a zone guide mounted upon the block, and anti-friction rollers mounted upon said frame adjacent to the zone guide.

20. A tellurian comprising a standard, a pivotal block mounted thereon, a sun axis, a bushing seated in an aperture in said block and in which said axis has a bearing, a yoke fastened to the block, an adjusting screw carried by the yoke and adapted to bear against the lower end of the axis, an adjustable zone guide mounted upon the block, a collapsible frame pivoted to said axis, anti-friction wheels carried by the frame adjacent to said guide, a rotatable globe mounted in suitable bearings upon the frame, and connections between the zone guide and globe for rotating the latter as it is revolved in its orbit.

21. A tellurian comprising a standard, a pivotal block mounted thereon, a sun axis journaled in said block, a plate fastened to the block and having angled ends, the opposite sides of said frame pivoted to said axis, angle bars pivotally mounted upon the angled ends of said plate and in alinement with the lower pivotal pointer between the frame and axis, a zone guide fastened to said angle bars, a rotatable globe mounted upon the frame, and connections intermediate the globe and zone guide, forming means for revolving the globe as it is moved through its orbit.

22. A tellurian comprising a standard, a pivotal block mounted thereon, a sun axis, a bushing seated in an aperture in said block and in which said axis has a bearing, an adjustable plate through which said bushing passes, the circumference of the latter being threaded, a nut engaging said threads and adapted to bear against the plate to hold the same in adjusted position, an adjustable zone guide mounted upon said plate, a collapsible frame pivoted to said axis, a globe journaled in suitable bearings in the frame, and connections intermediate the zone guide and globe for rotating the same as the latter revolves through its orbit.

23. A tellurian comprising a standard, a tilting block mounted thereon, a sun axis journaled in suitable bearings in the block, a collapsible frame having opposite sides pivotally connected to said axis, resilient arms fastened to the opposite sides of the frame, a counter-balanced rod mounted in said arms, a globe journaled in suitable bearings in the frame, a night hood carried by the frame and in which said globe rotates, an adjustable zone guide mounted upon the block, and connections between said guide and globe adapted to rotate the same as it is revolved through its orbit.

24. A tellurian comprising a standard, a block pivotally mounted thereon, a sun axis journaled in said block, a frame having two of its opposite sides pivotally connected to said axis, a counter-balanced rod connecting the corresponding ends of the side pieces of the frame, a globe having an axis, an apertured plate seated in the recess in one side of the frame and through which one end of the axis of the globe passes, a rotatable shaft with a recess in its upper end in which the lower end of the globe axis has universal joint connection, a strap bearing against the upper end of the axis of the globe and adapted to hold the lower end of the axis within its bearings, an adjustable zone guide, connections between the same and said rotatable shaft, forming means for rotating the globe as it revolves about its orbit.

25. A tellurian comprising a standard, a block pivotally mounted thereon, a sun axis journaled in said block, a frame having two of its opposite sides pivotally connected to said axis, a counter-balanced rod connecting the corresponding ends of the side pieces of the frame, a globe having an axis, an apertured plate seated in the recess in one side of the frame and through which one end of the axis of the globe passes, a rotatable shaft with a recess in its upper end in which the lower end of the globe axis has universal joint connection, a strap bearing against the upper end of the axis of the globe and adapted to hold the lower end of the axis within its bearings, an end piece pivotally connected to the side pieces and having a slot therein, a pin passing through the walls of said slot, a night hood having a lug mounted upon said pin and within which hood the globe is adapted to rotate, a guide, and connections between the same and said rotatable shaft.

26. A tellurian comprising a standard, a tilting collapsible frame mounted thereon, a globe having an axis, the ends of which are journaled in suitable bearings in the opposite sides of the frame, a circular band pivoted to the globe at points diametrically opposite and adapted to designate the different degrees of elevation between the equator and the pole.

In testimony whereof I hereunto affix my signature in the presence of two witnesses.

ISAAC F. BODLE.

Witnesses:
A. L. HOUGH,
FRANKLIN H. HOUGH.

Copies of this patent may be obtained for five cents each, by addressing the "Commissioner of Patents, Washington, D. C."